UNITED STATES PATENT OFFICE.

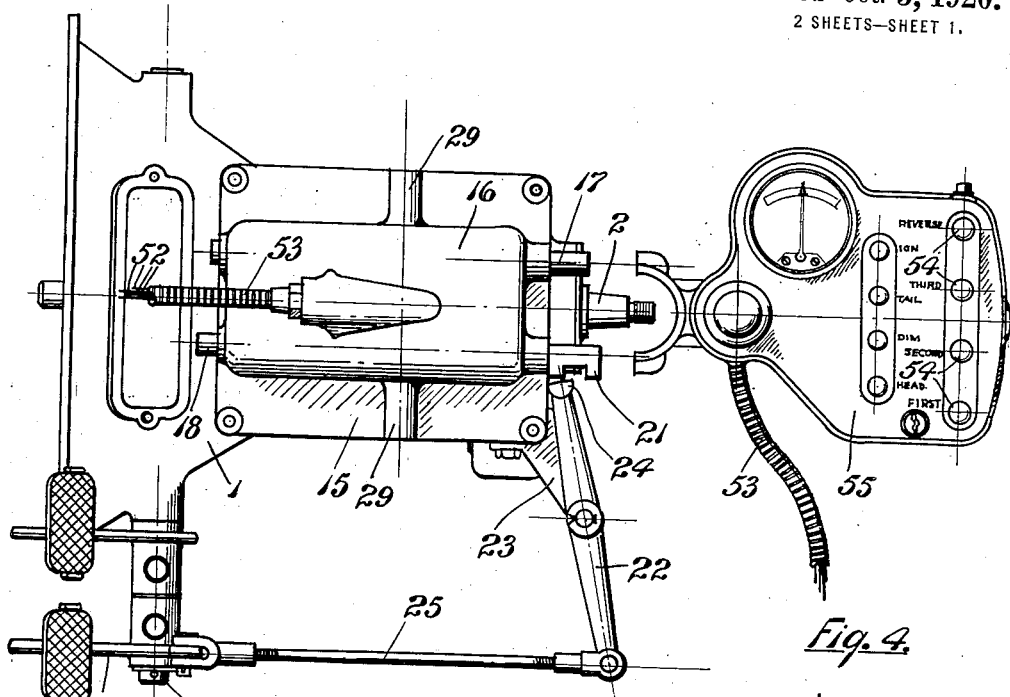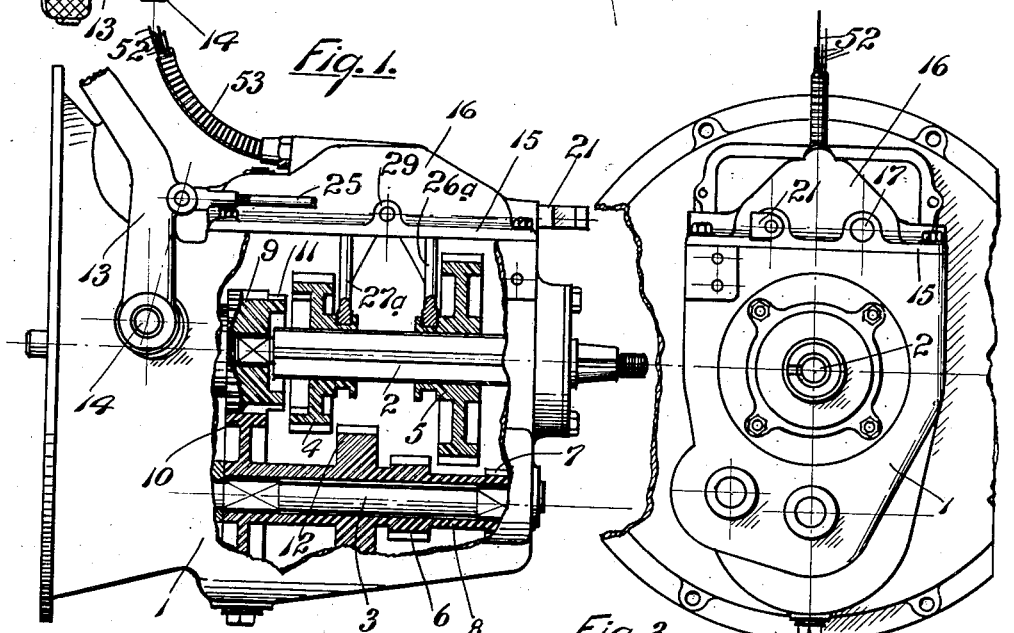

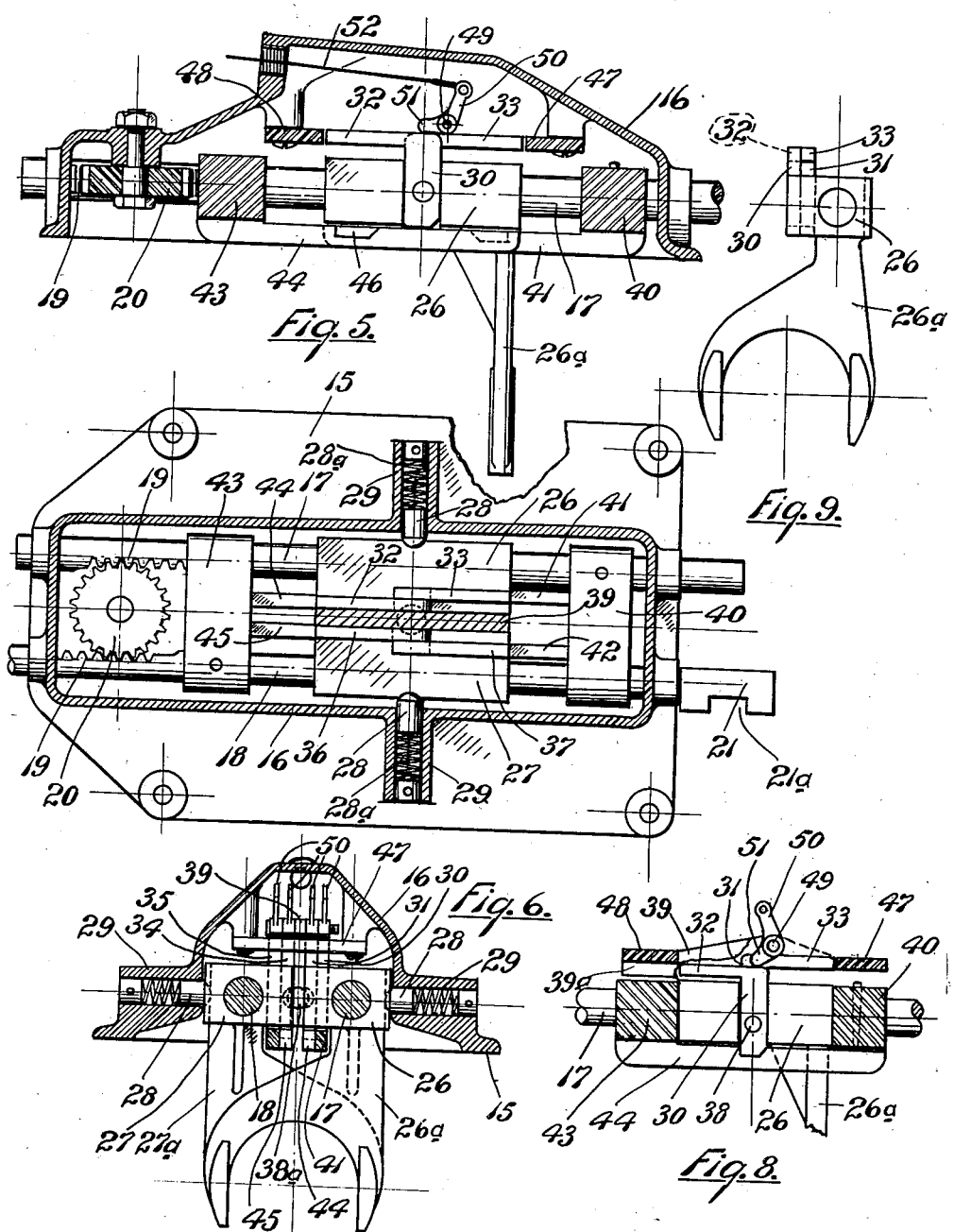

BAYARD E. RICHARDSON, OF GRAND RAPIDS, MICHIGAN, ASSIGNOR TO MECHANO GEAR SHIFT COMPANY, OF GRAND RAPIDS, MICHIGAN, A CORPORATION OF MICHIGAN.

TRANSMISSION-GEAR SHIFT APPLIANCE.

1,354,689. Specification of Letters Patent. Patented Oct. 5, 1920.

Application filed January 28, 1919. Serial No. 273,617.

*To all whom it may concern:*

Be it known that I, BAYARD E. RICHARDSON, a citizen of the United States of America, residing at Grand Rapids, in the county of Kent and State of Michigan, have invented certain new and useful Improvements in Transmission-Gear Shift Appliances; and I do hereby declare the following to be a full, clear, and exact description of the invention, such as will enable others skilled in the art to which it appertains to make and use the same.

This invention relates to sliding gear transmissions and is concerned with a particularly simple and effective mechanism adapted to be used in conjunction with change speed transmission gearings as applied to motor vehicles, for selecting and effecting the change of gears in the gearing according to selection. The present invention is in the nature of an improvement over the construction shown in my previous application for patent, Ser. No. 182,442, filed July 24, 1917, for gear shifts.

It is an object and purpose of the invention to construct a novel form of gear shifting mechanism in which positive movement of the gear to be shifted may be had and at the same time the selecting member which is manually operated for the selection of the shift desired is retained in a down-pressed position while all of the other selecting members are held in upper position and with their upper sides in the same plane, this following from the novel construction which I have made. A further object of the invention is to produce such mechanism in the fewest number of parts, all of which may be easily formed and assembled and with which a better and more perfect selection and shifting of gears through the force of the clutch spring may be obtained than heretofore, and with a mechanism of minimum cost of manufacture.

For an understanding of the invention and the construction by means of which these ends are attained together with many others not specifically set forth at this time, reference may be had to the following description, taken in connection with the accompanying drawings, in which, Figure 1 is a plan of a transmission gearing for motor vehicles equipped with my invention.

Fig. 2 is a side elevation, with parts broken away and shown in section to more fully disclose the construction.

Fig. 3 is an end elevation of the transmission case.

Fig. 4 is a plan of the mount for the selector buttons which are mounted in conjunction with other operating devices for control of the vehicle on which the invention is installed.

Fig. 5 is a longitudinal vertical section taken substantially centrally of the cover plate for the transmission case and illustrating the mechanism carried by said plate.

Fig. 6 is a horizontal section through said cover between its lower and upper faces.

Fig. 7 is a vertical section taken transversely through the rear portion of the cover.

Fig. 8 is a side elevation, partly in section of one of the gear operating yokes and illustrating the position of the parts for making connection between the same and the clutch pedal when the pedal has been moved to extreme forward position, and Fig. 9 is an end elevation of one of the gear shifting yokes.

Like reference characters refer to like parts in the different views of the drawings.

The transmission gearing is housed within a case 1 of the usual type found in unit transmissions. The transmission includes a shaft 2 and a counter or jack shaft 3 below it, on the former of which two gears 4 and 5 are splined. Gear 5 may be moved forward to mesh with a pinion 6 or to the rear to engage with the usual reversing pinion which is in mesh with a rear pinion 7, pinions 6 and 7 being formed integral with a sleeve 8 which covers the shaft or rod 3. Sleeve 8 is continuously driven through the interengagement of gears 9 and 10, the former being directly driven by the engine of the vehicle while the latter is formed integrally with or permanently connected to the sleeve. The gear 4 likewise may be moved forwardly to connect with a clutch 11 at the rear of gear 9 and formed integrally therewith, or to the rear to connect with gear 12 also integral with the sleeve 8. This is a standard type of change speed transmission of the sliding gear kind and by it the shaft 2 may be driven at three forward speeds with relation to the engine shaft, and at one speed in reverse, as will be clear to all familiar with the art of transmission gearings for motor vehicles. The clutch pedal 13 is mounted on a shaft 14 which extends into the casing 1 in front of the gearing and has the usual operative connections with the clutch for disengaging the same on forward movement thereof.

With my invention a special cover plate 15 is used to cover the top of the gear case, the same being provided with a raised central portion 16 which serves to mount and house the shifting apparatus and elements of the invention. Two rods 17 and 18 are slidably mounted in parallelism in the part 16 having bearing in and passing through the ends of such raised portion. Adjacent one end and on the inner side of each rod 17 and 18 a rack 19 is cut and a pinion 20 is disposed between the rods and rotatably mounted on part 16 meshing with both racks so that any movement imparted to one of the rods 17 or 18 causes a corresponding movement of the other but in the opposite direction. The rod 18 at its rear end is provided with a member 21 in one side of which a notch 21$^a$ is cut. A lever 22 is pivotally mounted between its ends on a bracket 23 attached to the case 1, the inner end of the lever having a head 25 of the shape shown which may enter the notch when the lever is turned about its pivot to move the rod 18 to the rear. A connecting rod 25 connects clutch pedal 13 with the outer end of lever 22 whereby on forward operation of the clutch pedal sufficiently the rod 18 may be moved, though it is apparent that before head 24 engages with the member 21, the clutch pedal is moved forward sufficiently to effect the disconnection of the clutch parts. When the pedal returns to normal position under the influence of the clutch spring, the rod 18 is returned to normal position likewise, as well as rod 17 which is actuated in the opposite direction whenever rod 18 is moved.

On the rods 17 and 18 two shifting members 26 and 27 are respectively mounted to slide back and forth on the rods, from which yokes 26$^a$ and 27$^a$ depend connecting, respectively, with sliding gears 5 and 4. In normal central position of the members 26 and 27 they are engaged by catches 28 spring pressed against said members by springs 28$^a$, the same being mounted in suitable projecting parts 29 on the cover 15. Such catches serve to hold the shifting members against accidental or aimless movement, but yield on application of force to permit the members to move along the rods 17 and 18.

On the inner side of each of the shifting members 26 and 27 vertical guideways are cut in which on the member 26, two vertical bars 30 and 31 are mounted side by side, the latter being positioned outside of the former, and from the upper ends of said bars horizontal arms 32 and 33, respectively, extend in opposite directions parallel to the length of the member 26 and normally positioned a short distance above it. Similarly, two vertical bars 34 and 35 are mounted side by side in the guideway of member 27, the former occupying the inner position, and said bars are provided at their upper ends with oppositely extending horizontal arms 36 and 37 as shown the same as bars 30 and 31 are provided with the arms 32 and 33. Arms 32 and 36 on the inner bars 30 and 34 extend in the same direction, and arms 33 and 37 on the bars 31 and 35 in the opposite direction. In the adjacent faces of the two inner vertical bars 30 and 34 hemispherical recesses 38 are formed and a ball 38$^a$ is disposed between said bars at said recesses being located in an opening in a plate 39 which is disposed between the shifting members 26 and 27. The design is such that whenever a shifting member is moved away from its central position, the ball is forced out of the recess 38 in the bar 30 or 34 which is moved with the shifting member and over into the recess of the other bar, this making a positive lock between plate 39 and the shifting member not moved, while any attempted simultaneous movement of both shifting members away from central position is absolutely precluded.

At the rear of the shifting members a neutralizing bar 40 is positioned extending between and mounted on the rods 17 and 18, being secured to rod 17 and slidably mounted on rod 18. From the lower side of said bar two fingers 41 and 42 extend under the shifting members 26 and 27 being located in the same planes with arms 33 and 37, respectively, so as to come directly under the lower ends of the vertical bars 31 and 35. A similar neutralizing bar 43 is located in front of the shifting members and mounted on the shifting rods 17 and 18, being, however, secured to the rod 18 and slidably mounted on the rod 17; and from this bar two fingers 44 and 45 extend rearwardly under the lower ends of vertical bars 30 and 34. All of the fingers 41, 42, 44 and 45 have their upper surfaces in the same horizontal plane and normally serve to elevate the different bars 30, 31, 34 and 35 and attached arms to the upper position shown in Fig. 5. Each finger, adjacent its free end is formed with a notch 46 in its upper side into which the various bars may be entered at their lower ends when the notches are brought to proper position, as shown in Fig. 8. This occurs whenever the clutch pedal is moved to extreme forward position, the result being that movement of the rod 18 rearwardly carries bar 43 against the front ends of members 26 and 27 and the opposite forward movement of the rod 17 carries bar 40 against the rear ends of said members, all of the notches 46 being brought into alinement directly under the different bars 30, 31, 34 and 35. It will be noted that said bars are beveled at one corner where they are to enter the notches 46 and that the notches are formed to correspond so that if any lower end of a vertical bar enters a notch and is not held therein, on return movement of the neutralizing bars 40 and 43 to normal position, the vertical bars are lifted to normal position.

Two stop bars 47 and 48 are positioned transversely of and within the part 16 in the same plane with the arms 32, 33, 36 and 37, the former being located at the ends of arms 33 and 37 and the latter at the ends of arms 32 and 36. The plate 39 is attached to these bars, having end extensions 39ª which come under the stop bars but above the neutralizing bars when they are moved toward central position as shown in Fig. 8.

The plate 39 serves to support a short shaft 49 on which four bell crank levers are pivotally mounted, each including a vertical arm 50 and a horizontal arm 51. The free ends of the arms 51 lie against the upper ends of the different vertical bars 30, 31, 34 and 35. A wire 52 is attached to each of the vertical arms 50, leading therefrom through the front of the housing part 16, all of the wires being inclosed in a flexible tube 53 whence they are operatively connected with operating buttons 54 mounted on any suitable supporting housing 55 in conjunction with the ignition and lighting control buttons as shown in my pending application Ser. No. 182,443, filed July 24, 1917. The operation of one of the buttons 54 is designed to pull on a wire 52, thereby turning a bell crank lever into position as shown in Fig. 8 to thereby force one of the four vertical bars into a notch 46, providing the notches are so located that a bar may enter the same, this being so only when the clutch pedal has been moved to extreme forward position and with all of the gears in neutral position. The particular connection of the selector buttons 54 with the various wires is not specifically illustrated, it being the same as shown in my pending application Ser. No. 182,442, to which reference has been made heretofore.

When the gearing is in neutral, the parts of the mechanism are located as shown in Figs. 2, 5 and 6. If it is desired to secure a certain connection of gears in the transmission gearing, the clutch pedal is moved to extreme forward position bringing bars 40 and 43 to the position shown in Fig. 8 and positioning the notches 46 directly below the lower ends of the different vertically movable bars mounted on the shifting members 26 and 27. The button 54 for the desired connection is then operated serving to pull on the connected wire 52, this operating a bell-crank lever and forcing one of the vertically movable connecting bars, such as 30 in Fig. 8, into its associated notch 46, connecting the shifting member 26 with the finger 44 and bringing arm 32 below the stop bar 48 so that on return of the clutch pedal toward normal position the shifting member 26 is moved with the bar 43 forward gear 5 being brought into engagement with pinion 6. Any other selection may be made and either shifting member 26 or 27 connected with either bar 40 and 43 to obtain any one of the four different speeds. Normally none of the vertically movable connecting bars will drop to lower position unless pressed down by operation of a selector button, but if any should the same are elevated to upper position as soon as the return of the fingers carries the notches 46 away; and except the one which is depressed and held down no operative connection is made. As soon as the movement of a shifting member 26 or 27 begins, the arm, such as 32, is carried under one of the stop bars, such as 48, this stopping any attempted return of the depressed bar to upper position.

To shift to another speed the clutch pedal is again moved to extreme forward position with the resultant movements of the neutralizing bars 40 and 43 toward center, causing a movement of either member 26 or 27 to central neutral position. Any other button for the change desired may be then operated and the shift of gears carried out as before. As soon as the change from one speed to another begins, the vertically movable bar, such as 30 in Fig. 8, which has been depressed, is elevated and the button previously depressed is restored to upper position, the button on the mount 55 which is down always indicating which speed is in service. Moreover the action is positive and all of the buttons not depressed are held up equal amounts so that there can be no mistake as to which speed is operating in the transmission.

This construction is simpler than those heretofore made by me and may be produced at less cost. It has all of the advantages of the previous construction shown in my pending application Ser. No. 182,442 as well as others due to simpler and more easily manufactured parts and a dispensing with some pivotally mounted parts and substitution of the vertically movable connecting bars which insures a more positive positioning of the indicating buttons as well as a simpler and better construction from a manufacturing standpoint.

I claim:

1. In a mechanism of the character described, a transmission gearing including a plurality of shiftable gears, a pair of rods slidably mounted adjacent the gears, a shifting member slidably mounted on each rod and connected each to a shiftable gear, a foot pedal, operative means interposed between the pedal and rods for reciprocating the rods in opposite directions with forward and return movements of the pedal, a neutralizing member connected to each rod and adapted to engage with the shifting members on the first reciprocatory movement of said rods to bring both shifting members to central neutral position, two fingers on each neutralizing member extending one under each shifting member, and means for selectively connecting either shifting member to either of the fingers below it when the pedal has been moved to forward position to bring the shifting members to neutral position.

2. In a mechanism of the character described, a transmission gearing including a plurality of shiftable gears, a pair of rods slidably mounted adjacent said gears, a shifting member slidably mounted on each rod and connected each to a shiftable gear, a foot pedal, means interposed between the pedal and the rods for moving the same back and forth in opposite directions with forward and return movements of the pedal, a neutralizing member connected to each rod, one of said members being located adjacent each end of the shifting members, two fingers extending from each neutralizing member, one alongside of each shifting member, and two separate devices slidably mounted on each shifting member to engage with the fingers and connect either shifting member with either neutralizing member, substantially as described.

3. In a mechanism of the character described, a transmission gearing including a plurality of shiftable gears, a pair of rods slidably mounted adjacent said gears, a shifting member slidably mounted on each rod and connected each to a shiftable gear, a foot pedal, means interposed between the pedal and the rods for moving said rods back and forth in opposite directions with forward and return movements of the pedal, a bar connected one to each rod at opposite ends of the shifting members and adapted to engage with either shifting member to position the same at central neutral position on the first movement of the rods caused by forward movement of the pedal, two fingers on each bar extending one under each shifting member, two connecting bars slidably mounted on each shifting member, one over each finger, and means for selectively actuating any of the connecting bars to engage with its associated finger when the pedal has been moved to forward position to bring the shifting members to neutral position.

4. In a mechanism of the character described, a shiftable gear, a slidably mounted rod, a shifting member mounted on the rod and slidable lengthwise thereof, said shifting member having connection with the gear, a second slidably mounted rod, means for moving one of the rods back and forth, connections between the rods for moving the other rod back and forth in opposite directions, a neutralizing member connected to each rod at opposite ends of the shifting member, a finger extending from each neutralizing member under the shifting member, and two separate devices associated one with each finger and movably mounted on the shifting member to connect with their respective fingers, substantially as and for the purpose described.

5. In a mechanism of the character described, a transmission gearing including a plurality of shiftable gears, a pair of rods slidably mounted adjacent said gears, a shifting member slidably mounted on each rod and connected each to a shiftable gear, each shifting member having a vertical slot cut in the inner face thereof, a foot pedal, means for moving the rods back and forth in opposite directions on forward and return movements of the clutch pedal, a bar connected to each rod, said bars being disposed one adjacent each end of the shifting members, two fingers extending from each bar, one of the fingers from each bar passing under the vertical slot in each shifting member, and each finger being provided with a notch in its upper side adjacent its free end, and two connecting bars slidably mounted side by side in the slot of each shifting member, a connecting bar being located directly over each finger and adapted to enter the notch therein when said notch is brought into proper position, and means to selectively force any connecting bar into the notch of its associated finger, substantially as described.

6. A construction containing the elements in combination claimed in claim 5 combined with an arm attached to the upper end of each connecting bar and extending in the same direction as the finger with which the connecting bar is associated, and a stop bar located above and at each end of the shifting members and in substantially the same plane with said arms when the connecting bars are in upper position, said arms being adapted to pass under the stop bars when in lower position, substantially as described.

7. In a mechanism of the character described, a transmission gearing including a plurality of shiftable gears, a pair of rods slidably mounted adjacent the gears, a shifting member slidably mounted on each rod and connected each to a shiftable gear, each shifting member having a vertical slot cut in the inner face thereof, a plate disposed between the shifting members and extending a distance above the same, a neutralizing member fixed on each rod, one of said members being located adjacent each end of the shifting members, two fingers extending from each neutralizing member under the vertical slots in the shifting members, one finger from each neutralizing member passing under each shifting member, means for reciprocating the rods in opposite directions to each other, two connecting bars positioned side by side in each slot of the shifting members, the lower ends thereof riding on the upper sides of the fingers, said fingers adjacent their free ends being formed with notches to receive the lower ends of the connecting bars, a shaft mounted on the plate, four bell-crank levers pivotally mounted on the shaft, each having an arm in contact with the upper end of a connecting bar, and means to operate the bell-crank levers to force the connecting bars downwardly into the notches of their respective fingers when the rods have been moved to bring the neutralizing members closely against the ends of the shifting members, substantially as described.

In testimony whereof I affix my signature.

BAYARD E. RICHARDSON.